United States Patent [19]
Douglas et al.

[11] Patent Number: 5,391,580
[45] Date of Patent: Feb. 21, 1995

[54] POLY(SULFONE-ALPHA-OLEFIN) COMPOSITE PERMSELECTIVE MEMBRANE ARTICLE FOR USE IN BLOOD OXYGENATION

[75] Inventors: Mary B. Douglas, Holland; Don N. Gray, Sylvania; Barry Watson; Christopher S. Youngen, both of Toledo, all of Ohio

[73] Assignee: Anatrace Inc., Maumee, Ohio

[21] Appl. No.: 59,558

[22] Filed: May 10, 1993

Related U.S. Application Data

[63] Continuation-in-part of Ser. No. 855,596, Mar. 20, 1992, abandoned.

[51] Int. Cl.$^6$ .......................... C08G 75/22; C08J 5/20; A61M 1/14
[52] U.S. Cl. ...................................... 521/27; 528/385; 422/48
[58] Field of Search .......................... 521/27; 528/385; 422/48

[56] References Cited

U.S. PATENT DOCUMENTS

| | | | |
|---|---|---|---|
| 2,201,544 | 5/1940 | Marvel | 260/94 |
| 3,563,189 | 2/1971 | Moore | 117/75 |
| 3,651,030 | 3/1972 | Desaolniess et al. | 260/79.3 |
| 3,673,612 | 7/1972 | Merrill et al. | 128/214 |
| 3,728,185 | 4/1973 | Gray | 156/89 |
| 3,744,642 | 7/1973 | Scala et al. | 210/500 |
| 3,798,185 | 3/1974 | Skiens et al. | 260/2.5 M |
| 3,928,294 | 12/1975 | Crawford et al. | 528/385 |
| 4,005,012 | 1/1977 | Wrasidlo | 210/23 H |
| 4,179,757 | 12/1979 | Crawford et al. | 528/385 |
| 4,214,020 | 7/1980 | Ward et al. | 422/48 |
| 4,239,729 | 12/1980 | Hasegawa | 422/48 |
| 4,376,095 | 3/1983 | Hasegawa et al. | 422/46 |
| 4,423,930 | 1/1984 | Gray | 351/160 R |
| 4,565,740 | 1/1986 | Golander et al. | 428/409 |
| 4,613,665 | 9/1986 | Farm | 536/20 |
| 4,713,292 | 12/1987 | Takemura et al. | 428/397 |
| 4,810,784 | 3/1989 | Larm | 536/20 |

FOREIGN PATENT DOCUMENTS

2304983  8/1973  Germany ........................... 528/385

OTHER PUBLICATIONS

"A Blood Oxygenator with Preformed Membrane–Lined Capillary Channels" vol. XV, Trans. Amer. Soc. Artif. Int. Organs, 1969, by: P. Dantowitz et al. pp. 138–143.

A Brochure entitled "Celegard Microporous Polypropylene Film–an Innovation in Porous Technology".

A Brochure entitled "Celgard Micropoporous Polypropylene Film–A Technical Bulletin."

Chapter 9 by Don N. Gray entitled "Polymeric Membranes for Artifical Lungs", taken from Polymeric Materials and Artifical Organs. ACS Symposium No. 256, 1984–The American Chemical Society.

"Artifical Lungs for Acute Respiratory Failure Theory and Practice", 1976, pp. 176–177.

Polymer Engineering & Science, Nov. 1978, vol. 18, No. 15, p. 1132.

Clinical Thrombosis, Kwaan & Samama, Editors, CRC Press Inc. 1989, pp. 279–282 & the attached compondium of Scientific Information, Medtronic/Carmeda Bioactive Surfaces.

Chapter by D. N. Gray entitled "The Status of Olefin–$SO_2$ Copolymers as Biomaterials," Biomedical and Dental Applications of Polymers edited by Gebelein & Koblitz, Plenum Pub. Corp. NY, N.Y., 1981.

*Primary Examiner*—G. S. Kishore
*Assistant Examiner*—Peter F. Kulkosky
*Attorney, Agent, or Firm*—John C. Purdue; David C. Purdue

[57] ABSTRACT

A biocompatable multi-layer article suitable for use in blood oxygenation is disclosed. The article is made up of a microporous polypropylene tube, a perm-selective, water vapor impermeable, carbon dioxide and oxygen permeable, homogeneous layer directly adhered to the polypropylene tube and active heparin linked through a covalent bond to the permselective layer. The polypropylene tube has an inside diameter from 240 to 400 $\mu$m, a wall thickness from 10 to 50 $\mu$m, and a porosity from (Abstract continued on next page.)

Activity of Immobilized Heparin

Activity of Immobilized Heparin

Abstract-continued 20 to 80 percent. The perm-selective layer is a polysulfone which has the structure

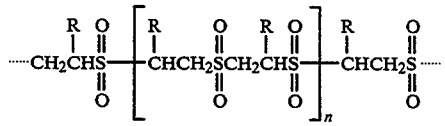

where R is an alkyl group having 16 carbon atoms and n is 3,500 to 35,000.

A method for producing a biocompatible multi-layer article suitable for use in blood oxygenation is also disclosed. The method involves the steps of immersing a microporous polypropylene tube which has an inside diameter from 240 to 400 $\mu$m, a wall thickness from 10 to 50 $\mu$m, and a porosity from 20 to 80 percent in a solution of a polysulfone which has the foregoing structure, and heating the coated polypropylene tube to a temperature that is above the softening point but below the decomposition temperature of the sulfone, e.g., in an oven heated to 70°–150° C.

A new poly(sulfone-alpha-olefin) is also disclosed. The new poly olefin has the structure of Formula 2, below:

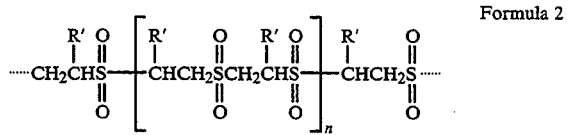

Formula 2 where the R' groups can be the same or different, most of them are C6 to C16 alkyls, n is an integer of at least 6, preferably from 3,500 to 35,000, and some of the repeating groups have the structure of Formula 3, below:

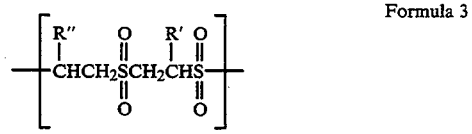

Formula 3 where R" is a bromoalkyl group having from 1 to 26 carbons, a methyl or ethyl ester of an alkyl carboxylic acid having from 1 to 26 carbons, or an alkyl aldehyde having from 1 to 26 carbons.

6 Claims, 2 Drawing Sheets

POLY(SULFONE-ALPHA-OLEFIN) COMPOSITE PERMSELECTIVE MEMBRANE ARTICLE FOR USE IN BLOOD OXYGENATION

REFERENCE TO RELATED APPLICATION

This is a continuation in part of application Ser. No. 07/855,596, filed Mar. 20, 1992, now abandoned for COMPOSITE PERMSELECTIVE MEMBRANE DEVICE FOR USE IN BLOOD OXYGENATION.

FIELD OF THE INVENTION

This invention relates to a composite permselective membrane article composed of a microporous polypropylene tube coated with a perm-selective, homogeneous polysulfone layer directly adhered to said polypropylene tube and active heparin moieties chemically bonded to said perm-selective layer. The polysulfone has the structure of Formula 1, below:

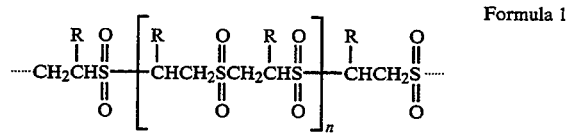

Formula 1 where R is an alkyl group having 16 carbon atoms and n is from 3,500 to 35,000. The number of active heparin moieties bonded to the perm-selective layer should be sufficient that they have a thrombus preventing effect on the article, which can be used in an "artificial lung" to oxygenate blood while the lungs of a patient are temporarily inoperable, an oxygen containing gas being directed through a plurality of the tubes while blood to be oxygenated is caused to flow in contact with the exterior of the tubes. Alternatively, the blood can be directed through the tubes while the oxygen containing gas is caused to flow in contact with the exterior of the tubes. In either case, oxygen from the gas permeates through the micropores of the tubes and polysulfone layer and into the blood, while carbon dioxide that is released from the blood permeates in the opposite direction through the polysulfone layer and the micropores and is carried away by the gas. The polysulfone is much less permeable to water vapor than the microporous polypropylene substrate; as a consequence, there is essentially no loss of water from blood being oxygenated, so long as there are no discontinuities in the perm-selective polysulfone layer through which water vapor can pass.

The invention also relates to a new poly(sulfone-alpha-olefin) which has the structure of Formula 2, below:

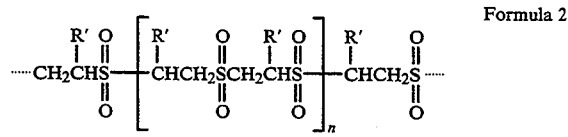

Formula 2 where the R' groups can be the same or different, most of them are C6 to C16 alkyls, n is an integer of at least 6, preferably from 3,500 to 35,000, and some of the repeating groups have the structure of Formula 3, below:

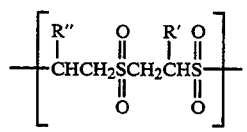

Formula 3 where " is a bromoalkyl group having from 1 to 26 carbons, a methyl or ethyl ester of an alkyl carboxylic acid having from 1 to 26 carbons, or an alkyl aldehyde having from 1 to 26 carbons.

THE PRIOR ART

Artificial lungs comprising a plurality of microporous polyolefin fibers through which blood is circulated while an oxygen gas is caused to flow around the exteriors of the fibers are known, being disclosed in "Hasegawa et al." (U.S. Pat. No. 4,239,729, granted Dec. 16, 1980) and in "Hasegawa" (U.S. Pat. No. 4,376,095, granted Mar. 8, 1983). The former patent states that the microporous polyolefin fibers preferably have inside diameters from 100 to 300 microns, a wall thickness from 10 to 50 microns, an average pore size from 0.02 to 0.10 micorn and a porosity from 20 to 80 percent, and preferably have at least the outer surfaces coated with a "thrombus preventing material", stating "A heparin-based material, e.g., benzalkonium-heparin, cethylpyridinium bromide-heparin is suitable for use as a thrombus-preventing material."- (column 5, lines 24 and following)

The former patent also states that "polyalkyl sulfone, ethylcellulose and polydimethylsiloxane *** " provide satisfactory coating materials; while the latter patent indicates that the average pore size can be as great as 0.20 micron.

Polyalkyl sulfones having the foregoing formula, their synthesis, properties and uses are disclosed in a family of patents including "Crawford and Gray" (U.S. Pat. No. 3,928,294, granted Dec. 23, 1975) "Crawford and Gray II" (U.S. Pat. No. 4,179,757, granted Dec. 25, 1979) and "Gray" (U.S. Pat. No. 4,423,930, granted Jan. 3, 1984). These patents indicate that the polyalkylsulfones are permeable to both oxygen and carbon dioxide, that the rate at which both are transmitted varies as a function of α olefin chainlength, the maximum rate for each being at a chain length of 16 carbon atoms, and suggest their use in the production of soft contact lenses, perfusion membranes, surgical tubing, artificial veins, artificial hearts and surgical dressings.

Further information concerning polyalkyl sulfones and their possible use in biomaterials and as membranes for artificial lungs can be found in a chapter by D. N. Gray entitled "THE STATUS OF OLEFIN-$SO_2$ COPOLYMERS AS BIOMATERIALS", *BIOMEDICAL AND DENTAL APPLICATIONS OF POLYMERS*, Edited by Charles G. Gebelein and Frank F. Koblitz, Plenum Publishing Corporation, New York, N.Y., 1981, and in a chapter by Don N. Gray entitled "POLYMERIC MEMBRANES FOR ARTIFICIAL LUNGS" in ACS Symposium Series No. 256, *POLYMER MATERIALS AND ARTIFICIAL ORGANS*, Charles G. Gebelein, Editor.

Heparin is a naturally occurring material which has been used as an anticoagulant for blood. It has been disclosed (e.g., by "Gölander et al." [U.S. Pat. No. 4,565,740, 1986], by "Larm" [U.S. Pat. No. 4,613,665, 1986] and by "Larm 2" [U.S. Pat. No. 4,810,784, 1989])

that heparin can be chemically bonded to such inert surfaces as polyvinyl chloride, polystyrene, polytetrafluoroethylene, polyethylene and polypropylene. Gölander et al. discloses first treating the inert surface with a polymeric anionic compound so that the anionic compound is adsorbed on the inert surface, constituting what can be denominated a "coupling agent", and then reacting heparin in an aqueous solution with the adsorbed anionic compound (coupling agent). Larm and Larm 2 point out that previous methods for covalent coupling of heparin to substrate surfaces had involved the use of coupling agents which had a plurality of sites with which functional groups separated from one another along the chain of the heparin molecule could and did react, and that heparin which has reacted at a plurality of sites along the chain of its molecule is not effective to prevent coagulation. Larm and Larm 2 also disclose that a substrate surface which has primary amino groups can be reacted with terminal aldehydic groups of partially degraded heparin to produce a Schiffs' base, and that the Schiffs' base can be reduced to produce a secondary amine wherein the heparin moiety retains its biological activity as an anticoagulant. The Larm references also disclose that partially degraded heparin having terminal aldehydic groups can be produced by diazotization.

THE INSTANT INVENTION

This invention is based upon the discovery of an improved biocompatible, multi-layer article which includes a coated, microporous tube and is particularly suitable for use in blood oxygenation. The article comprises a microporous polypropylene tube, a perm-selective, homogeneous layer directly adhered to the polypropylene tube and active heparin moieties chemically attached to the permselective layer, e.g., through secondary amine linkages. The microporous polypropylene tube has an inside diameter from 240 to 400 microns, a wall thickness from 10 to 50 microns, and a porosity from 20 to 80 percent. The micropores in the tube are long and narrow, formed by causing the tube to tear. The median tear is about 1.0 micron long and about 0.1 micron wide. The perm-selective layer is a polysulfone perm-selective material, which is water vapor impermeable, carbon dioxide and oxygen permeable, and has the structure set forth above where R is an alkyl group having 16 carbon atoms and n is from 3,500 to 35,000. The active heparin is covalently bonded to the coated tube, and preferably constitutes at least 0.1 microgram per square centimeter of coated fiber surface, most desirably at least 0.5 microgram per square centimeter of coated fiber surface.

The invention is also based upon the discovery of a method for producing a biocompatible multi-layer article suitable for use in blood oxygenation. The method comprises the steps of immersing a microporous polypropylene tube which has an inside diameter from 240 to 400 microns, a wall thickness from 10 to 50 microns, and a porosity from 20 to 80 percent in a solution of a polysulfone which has the structure set forth above, and heating the coated polypropylene tube to a temperature above the softening temperature but below the decomposition temperature of the polysulfone, e.g., in an oven heated to a temperature from 70° C. to 150° C. The latter temperature is approximately the decomposition temperature of the polysulfone, so that short residence times should be used at this temperature to avoid decomposition, while the former temperature is near the softening temperature, so that comparatively long residence times should be used to assure softening. It has been found that coating a microporous polypropylene tube with a polysulfone diminishes the transport of water vapor to less than one-fourth, that of the uncoated tube from 534 grams per hour per square meter to 119 grams per hour per square meter. The water vapor permeation rate is an important property of an article according to the invention, which should be as low as possible to minimize the loss of water while blood is being oxygenated. In another aspect the instant invention is based upon the discovery of a biocompatible multilayer article as described above which has an overall water vapor permeability not greater than 119 grams per hour per square meter and a an oxygen transfer rate of at least 5460 cubic centimeters per hour per square meter at blood and oxygen flow rates of 1.0 liter per minute.

Electron micrographs of a polysulfone coated polypropylene tube show a rough and discontinuous coating. However after the coated tube has been heat treated to a suitable temperature, e.g. about 125° C., the coating appears smooth with no crevices and valleys. The heat treatment melts the coating, allowing the discontinuities to be effectively filled. The smoother coating provides a benign surface along which laminar blood flow without turbulence is possible. This is important because mechanical stress, e.g., shear stress of 1500 to 3000 dynes per $cm^2$, can cause hemolysis, which is the rupture of red cells and their consequent loss of hemoglobin, which transports $O_2$ from the lungs to cells, and participates in the transport of $CO_2$ from cells to the lungs (see, for example, *Blood Compatible Synthetic Polymers*, Stephen D. Bruck, Charles C. Thomas, Publisher, Springfield, Ill., 1974.

Heat treatment of a microporous polypropylene tube coated with a polysulfone also affects gas permeation results. Coating thicknesses calculated from permeation data vary over a wide range depending upon whether $O_2$ or $CO_2$ gas is used. A complicated mathematical analysis indicates that discontinuities in the polysulfone layer cause these wide variations in calculated thickness. Heat treatment of the coated polypropylene tube effectively diminishes the disparity between the estimated coating thickness from $O_2$ and $CO_2$ permeation because, the calculations indicate, the peaks and valleys due to discontinuities are leveled.

In another aspect, the invention is a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms. In a preferred family, the poly(sulfone-alpha-olefins) are derived from sulfur dioxide and a mixture of a series C8 to C18 alpha olefin with from 0.1 to 10 percent of 8-bromo-1-octene, 5-bromo-1-pentene, or 6-bromo-1-hexene. In another preferred family, the poly(sulfone-alpha-olefins) are derived from sulfur dioxide and a mixture of a series C8 to C18 alpha olefin with from 0.1 to 10 percent of 10-undecenal. In yet another preferred family, the poly(sulfone-alpha-olefins are derived from sulfur dioxide and a mixture of a series C8 to C18 alpha olefin with from 0.1 to 10 percent of methyl-3,3-dimethyl-4-pentenoate or ethyl undecylenate.

In still another aspect, the invention is a biocompatible multi-layer article suitable for use in blood oxygenation, and comprising a microporous polypropylene tube, a perm-selective, water vapor impermeable, carbon dioxide and oxygen permeable, homogeneous layer directly adhered to said polypropylene tube and active heparin linked through a covalent bond to said permselective layer, wherein said microporous polypropylene tube has an inside diameter from 240 to 400 $\mu$m, a wall thickness from 10 to 50 $\mu$m, and a porosity from 20 to 80 percent, the perm-selective layer is a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms.

The invention is also a method for producing a biocompatible multi-layer article suitable for use in blood oxygenation, which method comprises the steps of immersing a micro porous polypropylene tube which has an inside diameter from 240 to 400 $\mu$m, a wall thickness from 10 to 50 $\mu$m, and a porosity from 20 to 80 percent in a solution of a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms.

Finally, the invention is a conjugate which comprises, as a substrate, a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms, and, attached thereto, an oligo or polysaccharide, said polysaccharide having as a terminal unit a 1-deoxy-2,5-anhydrohexitol entity, said entity being covalently bound in the 1-position thereof to an imino group associated with the substrate.

BRIEF DESCRIPTION OF THE DRAWINGS

FIG. 3 is a partially schematic perspective view showing apparatus that has been used to apply the polysulfone coating to microporous polypropylene tubes.

DESCRIPTION OF THE PREFERRED EMBODIMENTS

Figure 1:
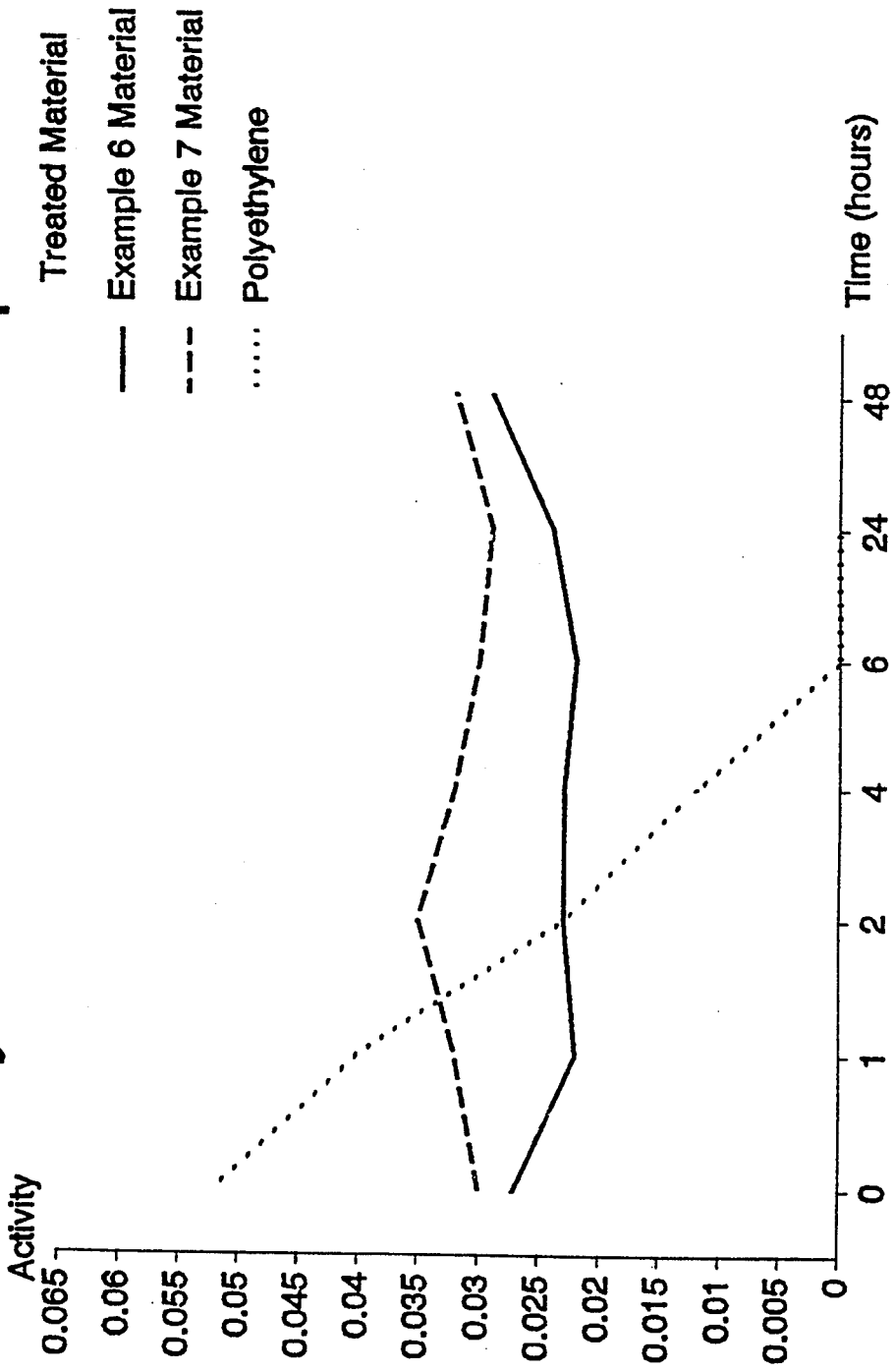
FIGS. 1 and 2 of the attached drawings are plots of the activity of immobilized heparinis, initially, and after various times of incubation, immersed in normal saline, some according to the instant invention, and some according to the prior art.

The following examples are presented solely for the purpose of illustrating and disclosing the invention, and are not to be construed as limiting. Example 1, where the tetrahydrofuran solution contains from 20 to 40 grams per liter of the polysulfone, and Example 5 constitute the best modes presently contemplated by the inventors, insofar as the invention is an improved biocompatible, multi-layer article which includes a coated, microporous tube or to a method for producing such an article. Examples 6–10 constitute the best modes insofar as the invention is directed to new poly(sulfone-alpha-olefins) and conjugates thereof with oligos or polysaccharides.

DEFINITIONS

As used herein, and in the appended claims, the terms "percent" and "parts" refer to percent and parts by weight, unless otherwise indicated; percent w/v means grams of solute per 100 milliliters of solution; porosity of a porous sheet or tube, in percent, means 100 times the area of the pores therein divided by the total area of the sheet or tube; g means gram or grams; $\mu$g means microgram or micrograms; cm means centimeter or centimeters; $\mu$m means micrometer or micrometers; mm means millimeter or millimeters; nm means nonometer or nanometers; L means liter or liters; mL means milliliter or milliliters; $\mu$L means microliter or microliters; psi means pounds per square inch; and MPa means $10^6$ Pascals.

All temperatures herein are in degrees celsius, unless otherwise indicated.

EXAMPLE 1

The apparatus shown in FIG. 3 was used to coat six microporous polypropylene hollow fibers, designated 10, which had been wound on a spool 11. The fibers 10 were passed over a segmented upper idler roll 12, downwardly under a segmented lower idler roll 13, upwardly over a segmented upper idler roll 14, downwardly under a segmented lower idler roll 15, upwardly over a segmented upper idler roll 16, and downwardly onto a take up roll 17. A constant speed motor 18 drove the take-up roll 17 so that the hollow fibers traveled at an axial speed of 80 cm per minute. There was a solution of a permselective polysulfone having the foregoing formula where n was 3,500 to 35,000 in each of two containers, one designated 19 which was positioned around and extended above the lower idler roll 13, and one designated 20 which was positioned around and extended above the lower idler roll 15. The fibers 10 were immersed in each of the solutions in the containers 19 and 20 for about 5 seconds. The microporous fibers 10 had outside diameters of 460 $\mu$m, inside diameters of 400 $\mu$m, and a porosity of 40 percent. The pores were long and narrow, formed by causing the lubes to tear. The median tear was about 1.0 $\mu$m long and about 0.1 $\mu$m wide.

The thickness of the polysulfone coating on the fibers was calculated as described below from the measured gas permeation, and the "bubble point" was determined as an indication of completeness of coverage. The "bubble point" determination was made by immersing in water a module composed of 5 coated strands. The module is constructed by bringing together the ends of 5 parallel strands to form a loop. The open ends of the hollow fiber are threaded through a nylon tube and about 6 cm of the strands are held in place with quick set epoxy. A cross-sectional cut is made to the nylon tubing so that the hollow ends of the tubular strands are exposed but secured within the nylon tube. Nitrogen is introduced into the tubes to cause a gradual increase in pressure until micro bubbles can be seen at the liquid contact surface of the coated fibers. The nitrogen pressure in the tubes when micro bubbles can be seen is recorded as the "bubble point" of the coated fibers; it is an indication of the completeness of coverage of the fibers, usually ranging from 10 to 20 psi gauge for modules coated according to the invention and less than 2 psi gauge for uncoated fibers.

Gas permeation was measured by mounting a plurality of coated fibers in a manifold that was closed in the sense that a gas that was introduced into the manifold could escape only by passing from the interior of the fibers to the exterior, introducing either oxygen or carbon dioxide into the fibers, and determining the average pressure drop in the manifold in cm Hg in a given time. From the foregoing data and gas permeation coefficients that have been calculated for different gases, the thickness of each coating was calculated, using the following equation:

$$p = \frac{dV}{t(A)(\text{delta } p)}$$

where p is the gas permeation coefficient in mL of gas flow . cm of film thickness per cm² of fiber surface per second per cm Hg difference in pressure;

V is the volume of the gas permeated at standard temperature and pressure;

d is the film thickness in cm;

A is the surface area of the polysulfone in cm²;

t is time in seconds; and delta p is the average pressure drop in cm Hg in the manifold.

In six different coating procedures carried out as described above, the containers 19 and 20 contained solutions of the polysulfone in tetrahydrofuran at six different concentrations. The following table gives the concentration of the polysulfone in the tetrahydrofuran, the bubble point, coating thickness calculated from permeability data for oxygen, and coating thickness calculated from permeability data for carbon dioxide for the coated fibers.

| Percent $w/v$ of polysulfone in tetrahydrofuran | Bubble Point, psi gauge | Calculated coating thickness, μm, using oxygen permeation data | Calculated coating thickness, μm, using carbon dioxide permeation data |
| --- | --- | --- | --- |
| 1 | 4 | 0.46 | 1.5 |
| 2 | 12 | 6.0 | 10.6 |
| 3 | 9 | 2.4 | 5.5 |
| 3.5 | >20 | 6.5 | 10.3 |
| 4 | 12 | 4.1 | 8.0 |
| 5 | >20 | 13.7 | 15.5 |

EXAMPLE 2

The procedure of Example 1 was repeated, except that the idler rolls 12 and 13 and the container 19 were not used, and there was a 3 percent w/v solution of the polysulfone in tetrahydrofuran in the container 20. The coated fibers had a bubble point of 5; the coating thickness was calculated to be 0.28 μm based upon oxygen and 1.1 μm based upon carbon dioxide permeation data.

EXAMPLE 3

Fibers coated as described in Example 2 were allowed to stand under ambient conditions, temperature about 22°, for twenty four hours, and were then coated a second time, using the procedure described in Example 2. The twice coated fibers were found to have a bubble point greater than 15 psi gauge (the maximum pressure the gauge used was capable of indicating); reliable permeation data from which coating thickness could be calculated were not obtained.

EXAMPLE 4

Fibers coated as described in Example 1 using a 3 percent w/v polysulfone solution in tetrahydrofuran were passed through an oven heated to 125°, residence time about 10 seconds, and were again tested for permeability to oxygen and carbon dioxide. The coating thickness, calculated from the oxygen permeation data after heat treatment, was 6.3 μm and was substantially the same as the coating thickness calculated from the carbon dioxide permeation data after heat treatment, which was 7.5 μm. A scanning electron photomicrograph of the coated fibers, before heat treatment, revealed that the coating was rough and had many discontinuities. After heat treatment, a scanning electron photomicrograph of the heat treated fibers showed that the coating was significantly smoother, and had noticeably fewer discontinuities. The permeability of the coated fibers to water vapor was the same before and after heat treatment. The oven temperature of 125° was above the softening temperature of the polysulfone but below the decomposition temperature of about 150°. In general, the heat treatment can effectively smooth the film and substantially equalize calculated coating thicknesses based upon $O_2$ and $CO_2$ permeation data when it is carried out in an oven heated to a temperature from 70° to 150°, using a residence time sufficiently long to soften the polysulfone, but sufficiently short that the polysulfone is not decomposed.

EXAMPLE 5

Heat treated coated fibers produced as described in Example 4 are immersed at room temperature of about 22° for 4 minutes in concentrated (96 percent) sulfuric acid containing 2 g per liter of $KMnO_4$, and are then rinsed with deionized water. The rinsed fibers are then immersed for about 5 minutes in a 0.01 percent aqueous solution of a commercial polyethylene imine having a molecular weight in the range of 600,000 to 1,000,000 Daltons. The fibers are then incubated with a solution (20 mg per mL) of partially degraded heparin in a phosphate buffer, pH 7.0, for 24 hours at room temperature of about 22° and then treated (reduced) by immersion in a sodium cyanoborohydride solution (0.5 mg per mL). The fibers are then rinsed carefully with deionized water, and are ready for installation in a blood oxygenating device of the type discussed above. The polyethylene imine reacts with the treated polysulfone surface, forming a covalent bond, while a terminal aldehyde group of the partially degraded heparin reacts with an imine group of the polyethylene imine, producing a Schiff's base structure (—CH=N—), which is then reduced to a secondary amine by the sodium cyanoborohydride. The partially degraded heparin, because it has only one aldehyde moiety in its molecule, is attached to the polyethylene imine at only one point and, therefore, remains active. Each of the fibers is a microporous polypropylene tube, with a perm-selective, water vapor impermeable, carbon dioxide and oxygen permeable, homogeneous layer directly adhered to said polypropylene tube and a plurality of active heparin moieties chemically bonded to said permselective layer, wherein said microporous polypropylene tube has an inside diameter from 240 to 400 μm, a wall thickness from 10 to 50 μm and a porosity from 20 to 80 percent, and the perm-selective layer is a polysulfone which has the structure of Formula 1, supra, where R is an alkyl group having 16 carbon atoms, and n is 3,500 to 35,000.

The partially degraded heparin used as described above in Example 5 is produced by adding 10 mg sodium nitrite, with stirring, to a solution of 1 g heparin in 300 mL deionized water after the heparin solution has been cooled to 0° on an ice bath, and making a dropwise addition of a 2 mL portion of acetic acid. Stirring is continued during the acetic acid addition, and for another 2 hours, after which time the reaction mixture is worked up by dialysis against distilled water and lyophilization.

Several new poly(sulfone-alpha-olefins) have also been synthesized. These poly(sulfone-alpha-olefins) are derived from sulfur dioxide and a mixture of a series $C_8$ to $C_8$ alpha olefin with from 0.1 to 10 percent of a monobrominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms. Example 6, below, describes the synthesis of such a polymer from sulfur dioxide and substantially an equimolecular proportion of 1-hexadecene containing 2 percent of 8-bromo-1-octene ($H_2C=CH(CH_2)_6Br$).

EXAMPLE 6

A clean, dry bottle that had been purged with nitrogen and cooled on an ice water bath was charged with liquid sulfur dioxide. Substantially an equimolecular proportion, based upon the sulfur dioxide, of 1-hexadecene containing 5 percent of 8-bromo-1-octene and 1 percent of tert-butyl hydroperoxide was added slowly to the bottle, and the contents of the bottle were agitated gently at room temperature of about 20° for one hour. A rapid reaction occurred after about one fourth of the addition product had been added to the bottle, causing some loss of sulfur dioxide. After the addition was completed, the bottle was capped with a lined, ventable cap, and the contents were allowed to warm to, and to stand at, room temperature for about 20 hours. The bottle was then vented, and the copolymer was subjected to reduced pressure of about 100 mm Hg to remove residual monomers therefrom. The copolymer was found to have the structure of Formula 2, supra, where the R' groups were straight chain alkyls having 14 carbons, n was an integer which averaged about 30,000, and one of every 45 of the repeating groups had the structure of Formula 3, supra, where R" was $-(CH_2)_6-Br$. The bromine content of the 1-hexadecene starting material containing 5 percent of 8-bromo-1-octene was 0.80 percent; the polymer was found to contain 0.42 percent of bromine. The molecular weight of the polymer, determined by gel permeation chromatography (ASTM D 3593) was found to range from about 8 to 9 million Daltons; the monomer content of the polymer was less than 0.02 percent, the limit of detection.

The polymer produced as described above was dissolved in toluene to produce a 3 percent solution, and a film about 0.1 mm thick was cast on a glass plate from the solution. The film, after the toluene had evaporated to such an extent that it was self-sustaining, was removed from the plate, dried, and stirred for about 1 hour in a solution containing 0.69 percent w/v polyethylene imine from which particulates, material having a molecular weight greater than $10^6$ and material having a molecular weight less than $10^5$ had been removed by filtration through suitable membranes. The membrane used to remove particulates had a pore size of 1.2 µm. The solvent for the polyethylene imine was composed of equal volumes of deionized water and ethanol.

The film treated with polyethylene imine as described in the previous paragraph was then incubated for 24 hours at room temperature of about 22° with an aqueous solution of partially degraded heparin (20 mg per mL in a phosphate buffer, pH 7.0) produced as described above with reference to Example 5, and was treated (reduced) by immersion in a sodium cyanoborohydride solution (0.5 mg per mL). The film was then rinsed carefully with deionized water.

The film with immobilized heparin produced as described in the previous paragraph was cut into rectangular strips which measured 2 cm by 5 cm; the initial (time zero) heparin activity was measured; and the strips were immersed in normal saline, and heparin activity was measured again after various times of incubation. The heparin activities are set forth in the following table:

| Incubation Time (hours) | Activity of Heparin Polymers |
| --- | --- |
| 0 | 0.027 |
| 1 | 0.022 |
| 2 | 0.023 |
| 4 | 0.023 |
| 6 | 0.022 |
| 24 | 0.024 |
| 48 | 0.029 |

The data from the foregoing table are presented graphically in FIG. 1.

A solution in tetrahydrofuran containing about 3 percent of the poly(sulfone-alpha-olefin) produced as described in Example 6 was used to coat the polypropylene tubes described in Example 1, using the method of Example 1, and the coated tubes were heat treated as described in Example 4. The heat treated coated fibers were then immersed for about 5 minutes in a 0.01 percent aqueous solution of a commercial polyethylene imine having a molecular weight in the range of 600,000 to 1,000,000 Daltons. The fibers were then incubated with a solution (20 mg per mL) of partially degraded heparin in a phosphate buffer, pH 7.0, for 24 hours at room temperature of about 22° and then treated (reduced) by immersion in a sodium cyanoborohydride solution (0.5 mg per mL). The fibers were then rinsed carefully with deionized water, and were ready for installation in a blood oxygenating device of the type discussed above. The polyethylene imine reacts with the bromine groups on the polysulfone surface, forming a covalent bond, while a terminal aldehyde group of the partially degraded heparin reacts with an imine group of the polyethylene imine, producing a Schiff's base structure ($-CH=N-$), which is then reduced to a secondary amine by the sodium cyanoborohydride. The partially degraded heparin, because it has only one aldehyde moiety in its molecule, is attached to the polyethylene imine at only one point and, therefore, remains active.

Other poly(sulfone-alpha-olefins) according to the invention have been produced by the method described in Example 6 from sulfur dioxide and a mixture 1-hexadecene and a second alpha olefin. Examples of second olefins that have been used to produce such polymers, the percentages of each in the monomer and in the polymer and the number of repeating units per second alpha olefin moiety in the polymer are set forth in the following table. The ethyl ester of undecylenic acid is $CH=CH(CH_2)_8COOC_2H_5$.

| Example | Second alpha olefin | Percent in monomer | Percent in polymer | Repeating units per second olefin moiety |
|---|---|---|---|---|
| 7 | Ethyl undecylenate | 2.0 | 0.42 | 1 in 101 |
| 8 | Ethyl undecylenate | 5.0 | 1.6 | 1 in 26 |
| 9 | Ethyl undecylenate | 10.0 | 3.9 | 1 in 11 |
| 10 | 8-bromo-1-octene | 2.0 | 1.75 | 1 in 55 |

In all cases, the molecular weights of the copolymers, determined by gel permeation chromatography, were in the 3–7 million Dalton range, and monomer content was less than the limit of detection (0.02 percent).

The polymer of Example 7 was dissolved in toluene to produce a 3 percent solution, and a film about 0.1 mm thick was cast on a glass plate from the solution. The film, after the toluene had evaporated to such an extent that it was self-sustaining, was removed from the plate, dried, and stirred for about 1 hour in a solution containing 0.69 percent w/v polyethylene imine from which particulates, material having a molecular weight greater than $10^6$ and material having a molecular weight less than $10^5$ had been removed by filtration through suitable membranes. The membrane used to remove particulates had a pore size of 1.2 μm. The solvent for the polyethylene imine was composed of equal volumes of deionized water and ethanol.

The film treated with polyethylene imine as described in the previous paragraph was then incubated for 24 hours at room temperature of about 22° with an aqueous solution of partially degraded heparin (20 mg per mL in a phosphate buffer, pH 7.0) produced as described above with reference to Example 5, and was treated (reduced) by immersion in a sodium cyanoborohydride solution (0.5 mg per mL). The film was then rinsed carefully with deionized water.

The film with immobilized heparin produced as described in the previous paragraph was cut into rectangular strips which measured 2 cm by 5 cm; the initial (time zero) heparin activity was measured; and the strips were immersed in normal saline, and heparin activity was measured again after various times of incubation. The heparin activities are set forth in the following table:

| Incubation Time (hours) | Activity of Heparin Polymers |
|---|---|
| 0 | 0.030 |
| 1 | 0.032 |
| 2 | 0.035 |
| 4 | 0.032 |
| 6 | 0.030 |
| 24 | 0.029 |
| 48 | 0.032 |

The data from the foregoing table are presented graphically in FIG. 1.

For purposes of comparion, but not in accordance with the instant invention, commercially available polyethylene sheet material that had been treated according to Larm and Larm 2 to provide active heparin sites was cut into rectangular strips which measured 2 cm by 5 cm; the initial (time zero) heparin activity was measured; and the strips were immersed in normal saline, and heparin activity was measured again after various times of incubation. The heparin activities are set forth in the following table:

| Incubation Time (hours) | Activity of Heparin Polymers |
|---|---|
| 0 | 0.052 |
| 1 | 0.040 |
| 2 | 0.023 |
| 4 | 0.012 |
| 6 | 0.0 |
| 24 | 0.0 |
| 48 | 0.0 |

The data from the foregoing table are presented graphically in FIG. 1.

It will be appreciated that the heparin treated sheets of the polysulfones of Examples 6 through 10 are conjugates which comprise, as substrates, poly(sulfone-alpha-olefins) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms, and, attached thereto, an oligo or polysaccharide, said polysaccharide having as a terminal unit a 1-deoxy-2,5-anhydrohexitol entity, said entity being covalently bound in the 1-position thereof to an imino group associated with the substrate (see Larm and Larm 2, supra).

For purposes of comparison, but not in accordance with the instant invention, the heparin activity of purchased polyethylene and polyvinylchloride films that had been treated for two minutes at room temperature with concentrated sulfuric acid containing two grams per liter of potassium permanganate, completely rinsed, and then reacted with a fractionated solution of polyethylene imine, with partially degraded heparin, and with a sodium cyanoborohydride solution as described above was determined, as described above. Rectangular strips which measured 2 cm by 5 cm were cut from the film; the initial (time zero) heparin activity was measured; and the strips were immersed in normal saline, and heparin activity was measured again after various times of incubation. The determined heparin activities and those of the Example 6 and Example 7 materials are set forth in the following table, where the various entries are percent of 0 time activity.

| Incubation Time (hours) | Activity of Heparin Polymers | | | |
|---|---|---|---|---|
| | Example 7 | Example 6 | Polyethylene | Polyvinyl chloride |
| 0 | 100 | 100 | 100 | 100 |
| 2 | 116 | 85 | 80 | 62 |
| 6 | 100 | 85 | 49 | 35 |
| 24 | 97 | 89 | 39 | 2 |
| 48 | 107 | 107 | 0 | 0 |

Figure 2:
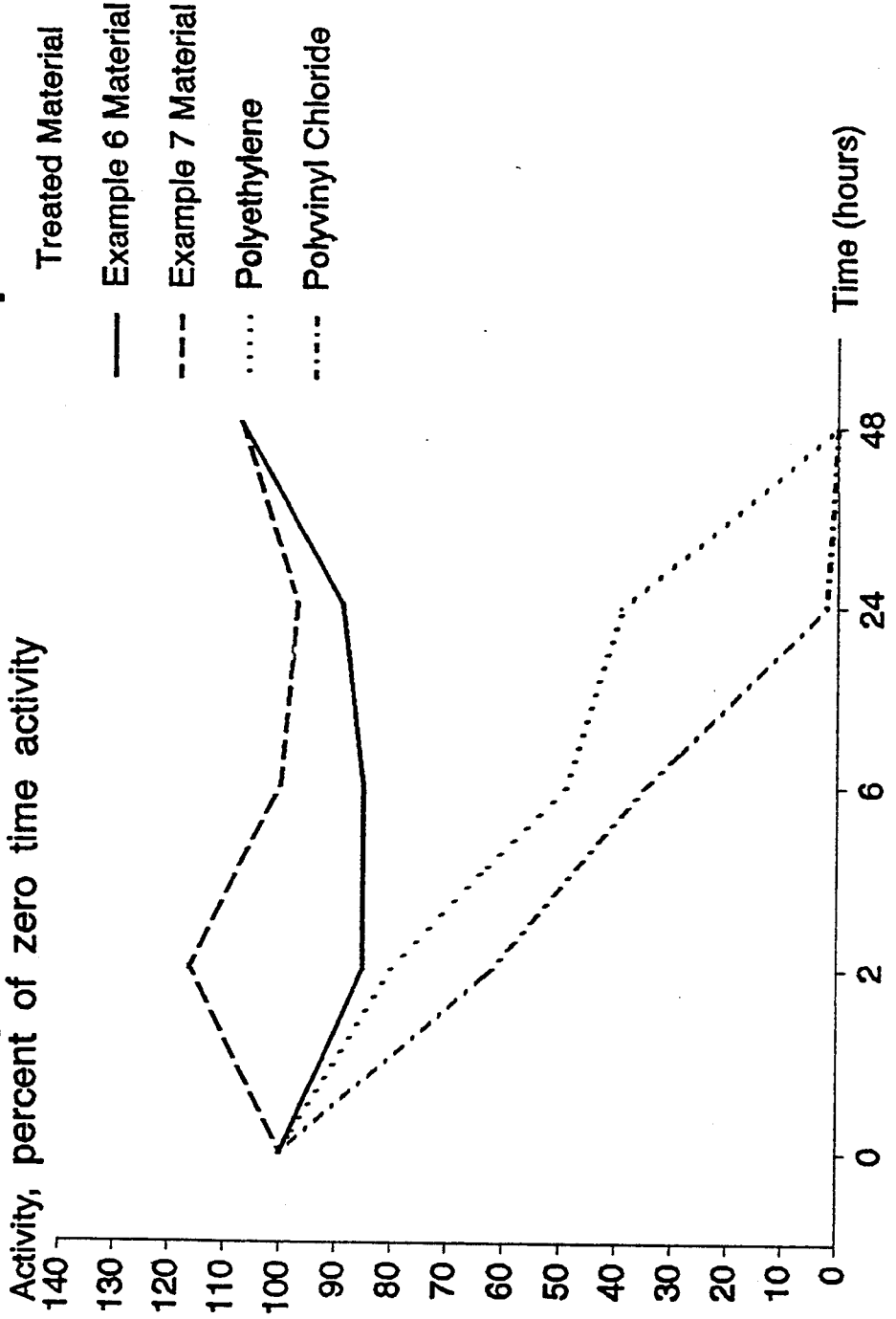

The data from the foregoing table are presented graphically in FIG. 2.

Poly(sulfone-alpha-olefins) according to the instant invention can also be produced by the method of Example 6 from sulfur dioxide and substantially equimolecular proportions of 1-hexadecene or of another C8 to C18 alpha olefin with from 0.1 to 10 percent of a monobrominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms. It will be appreciated that 8-bromo-1-octene, 5-bromo-1-pentene, and 6-bromo-1-hexene are preferred monobrominated alpha olefins, that 10-undecenal is a preferred alpha olefin aldehyde, and that methyl-3,3-dimethyl-4-pentenoate and ethyl undecylenate are preferred esters of alpha olefin carboxylic acids.

It will be appreciated that various changes and modifications are possible from the preferred embodiments of the invention as described above without departing from the spirit and scope of the attached claims.

We claim:

1. As a composition of matter, a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms, the amount of the mono-brominated olefin, of the carboxylic acid methyl or ethyl ester or of the alpha aldehyde in the poly(sulfone-alpha-olefin) being sufficiently great to increase the heparin activity of the poly(sulfone-alpha-olefin) after incubation in normal saline, said poly(sulfone-alpha olefin) having the structure of Formula 2, below,

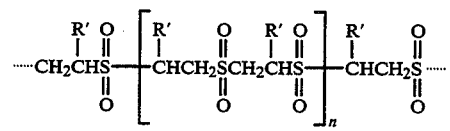
Formula 2 where the R' groups can be the same or different, most of them are C6 to C16 alkyls, n is an integer of at least 6, and some of the repeating groups have the structure of Formula 3, below:

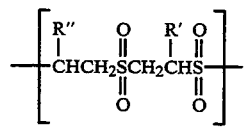
Formula 3 where R" is a bromoalkyl group having from 1 to 26 carbons, a methyl or ethyl ester of an alkyl carboxylic acid having from 1 to 26 carbons, or an alkyl aldehyde having from 1 to 26 carbons.

2. A poly(sulfone-alpha-olefin) as claimed in claim 1 derived from sulfur dioxide and a mixture of a series C8 to C18 alpha olefin with from 0.1 to 10 percent of 8-bromo-1-octene, 5-bromo-1-pentene, or 6-bromo-1-hexene.

3. A poly(sulfone-alpha-olefin) as claimed in claim 1 derived from sulfur dioxide and a mixture of a series C8 to C18 alpha olefin with from 0.1 to 10 percent of 10-undecenal.

4. A poly(sulfone-alpha-olefin) as claimed in claim 1 derived from sulfur dioxide and a mixture of a series C8 to C18 alpha olefin with from 0.1 to 10 percent of methyl-3,3-dimethyl-4-pentenoate or ethyl undecylenate.

5. A biocompatible multi-layer article suitable for use in blood oxygenation, said article comprising a microporous polypropylene tube, a perm-selective, water vapor impermeable, carbon dioxide and oxygen permeable, homogeneous layer directly adhered to said polypropylene tube and active heparin linked through a covalent bond to said permselective layer, wherein said microporous polypropylene tube has an inside diameter from 240 to 400 μm, a wall thickness from 10 to 50 μm, and a porosity from 20 to 80 percent, the perm-selective layer is a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms, the amount of the mono-brominated olefin, of the carboxylic acid methyl or ethyl ester or of the alpha aldehyde in the poly(sulfone-alpha-olefin) being sufficiently great to increase the heparin activity of the poly(sulfone-alpha-olefin) after incubation in normal saline, said poly(sulfone-alpha olefin) having the structure of Formula 2, below,

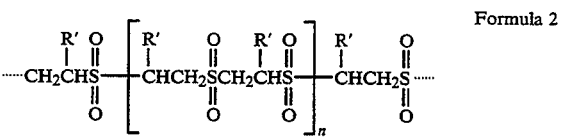
Formula 2 where the R' groups can be the same or different, most of them are C6 to C16 alkyls, n is an integer of at least 6, and some of the repeating groups have the structure of Formula 3, below:

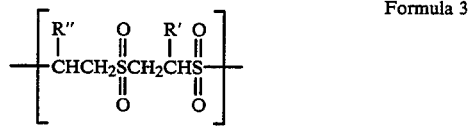
Formula 3 where R" is a bromoalkyl group having from 1 to 26 carbons, a methyl or ethyl ester of an alkyl carboxylic acid having from 1 to 26 carbons, or an alkyl aldehyde having from 1 to 26 carbons.

6. A method for producing a biocompatible multi-layer article suitable for use in blood oxygenation, said method comprising the steps of immersing a microporous polypropylene tube which has an inside diameter from 240 to 400 μm, a wall thickness from 10 to 50 μm, and a porosity from 20 to 80 percent in a solution of a poly(sulfone-alpha-olefin) derived from sulfur dioxide and a mixture of a series $C_8$ to $C_{18}$ alpha olefin with from 0.1 to 10 percent of a mono-brominated alpha olefin having from 3 to 28 carbon atoms, a methyl or ethyl ester of an alpha olefin carboxylic acid having from 3 to 28 carbon atoms or an alpha olefin aldehyde having from 3 to 28 carbon atoms, the amount of the mono-brominated olefin, of the carboxylic acid methyl or ethyl ester or of the alpha aldehyde in the poly(sulfone-alpha-olefin) being sufficiently great to increase the heparin activity of the poly(sulfone-alpha-olefin) after incubation in normal saline, said poly(sulfone-alpha olefin) having the structure of Formula 2, below,

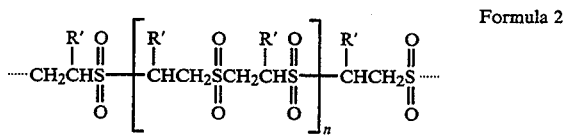
Formula 2 where the R' groups can be the same or different, most of them are C6 to C16 alkyls, n is an integer of at least 6, and some of the repeating groups have the structure of Formula 3, below:
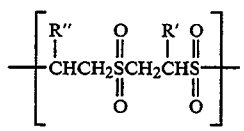
Formula 3
where R" is a bromoalkyl group having from 1 to 26 carbons, a methyl or ethyl ester of an alkyl carboxylic acid having from 1 to 26 carbons, or an alkyl aldehyde having from 1 to 26 carbons.
* * * * *

UNITED STATES PATENT AND TRADEMARK OFFICE
CERTIFICATE OF CORRECTION

PATENT NO. : 5,391,580
DATED : February 21, 1995
INVENTOR(S) : Mary B. Douglas et al.

It is certified that error appears in the above-identified patent and that said Letters Patent is hereby corrected as shown below:

Column 2, Line 9 should read
where R" is a bromoalkyl group having from 1 to 26

Signed and Sealed this

Fifth Day of March, 1996

BRUCE LEHMAN

*Attest:*

*Attesting Officer*  *Commissioner of Patents and Trademarks*